United States Patent
Bourget

(10) Patent No.: US 6,647,186 B2
(45) Date of Patent: Nov. 11, 2003

(54) OPTICAL FIBER CABLE AND A METHOD OF FABRICATING THE CABLE

(75) Inventor: Vincent Bourget, Boulogne sur Mer (FR)

(73) Assignee: Alcatel, Paris (FR)

(*) Notice: Subject to any disclaimer, the term of this patent is extended or adjusted under 35 U.S.C. 154(b) by 11 days.

(21) Appl. No.: 09/956,006

(22) Filed: Sep. 20, 2001

(65) Prior Publication Data

US 2002/0034366 A1 Mar. 21, 2002

(30) Foreign Application Priority Data

Sep. 21, 2000 (FR) .......................................... 00 12044

(51) Int. Cl.[7] ................................................ G02B 6/44
(52) U.S. Cl. ...................................... 385/106; 385/102
(58) Field of Search ................................. 385/100–114

(56) References Cited

U.S. PATENT DOCUMENTS

| | | | | |
|---|---|---|---|---|
| 4,645,298 A | * | 2/1987 | Gartside, III | 385/106 |
| 4,801,192 A | * | 1/1989 | Wehner | 385/101 |
| 4,898,451 A | * | 2/1990 | Story | 385/106 |
| 5,343,549 A | * | 8/1994 | Nave et al. | 385/103 |

FOREIGN PATENT DOCUMENTS

| | | | | |
|---|---|---|---|---|
| EP | 0 033 123 A2 | 5/1981 | | 385/106 |
| EP | 0 846 970 A1 | 6/1998 | | 385/106 |

* cited by examiner

*Primary Examiner*—Hung N. Ngo
(74) *Attorney, Agent, or Firm*—Sughrue Mion, PLLC

(57) ABSTRACT

The optical fiber cable includes an assembly of at least two flexible tubes accommodating optical fibers, a sheath enveloping the assembly of tubes, and at least one filamentary form strength member at the periphery of the assembly of tubes. The tubes preferably extend in the sheath in a helical or an SZ assembly. The tubes are stuck together. The sheath is preferably made of polyethylene and the tubes are preferably made of polyvinyl chloride (PVC) or a thermoplastics elastomer with diol flexible segments. In this method, when extruding the sheath around the tubes, the temperature at which the material of the sheath is extruded is adjusted to cause the tubes to stick together.

12 Claims, 1 Drawing Sheet

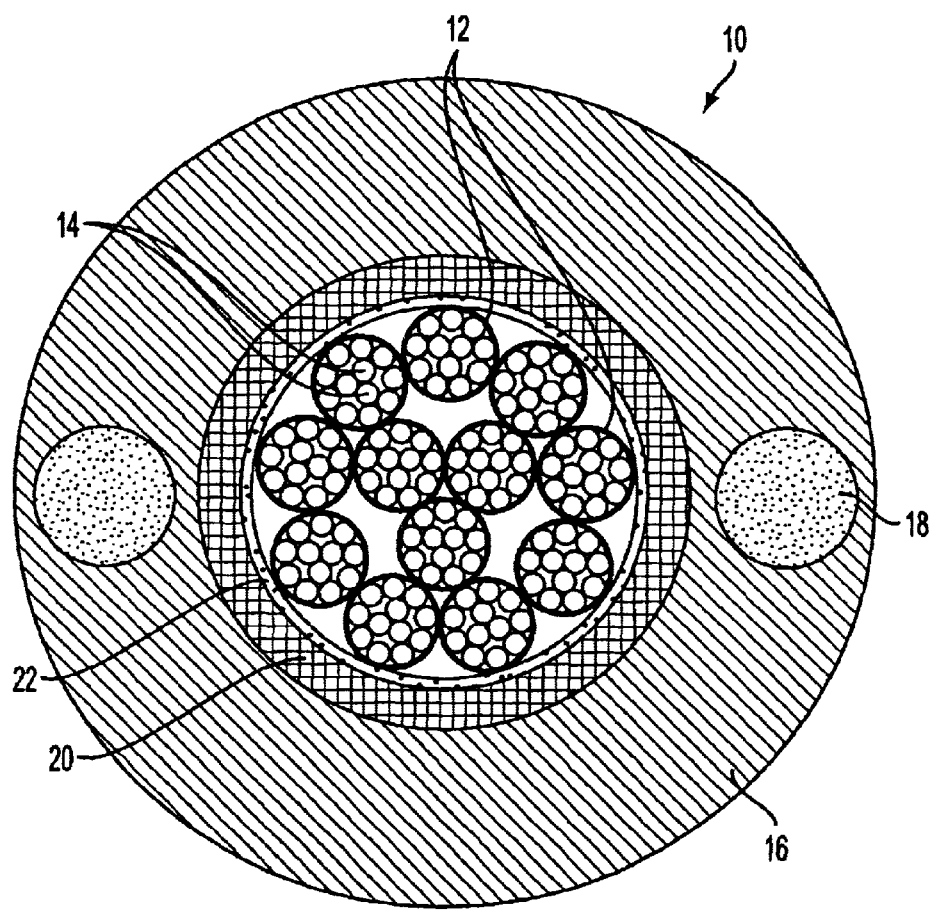
FIGURE

OPTICAL FIBER CABLE AND A METHOD OF FABRICATING THE CABLE

The present invention relates to an improved optical fiber cable and a method of fabricating the cable.

BACKGROUND OF THE INVENTION

Optical fiber cables, referred to hereinafter as optical cables, usually have one of three types of structure.

In a first type of structure, the optical cable includes a central strength member of filamentary form around which tubes accommodating optical fibers are assembled in a helical or an SZ assembly. The assembly of tubes is covered with a sheath. In that first type of structure, the tubes containing the optical fibers are delimited by relatively thick and rigid synthetic material walls. Relative movement between the optical fibers and the tubes that contain them is possible. Cables having a structure of that first type are described in the documents U.S. Pat. No. 4,366,677 and EP-A-0 846 970, for example.

In a second type of structure, the optical cable includes a single synthetic material tube, usually referred to as a "uni-tube", accommodating optical fibers and, where applicable, tapes, possibly assembled together in a helix. The uni-tube is covered by a sheath delimited by a wall, possibly with filamentary form strength members buried in the wall.

In the third type of structure, the optical cable includes synthetic material tubes accommodating optical fibers and assembled together in a helical or an SZ assembly. The assembly of tubes is covered with a sheath delimited by a wall, possibly with filamentary form strength members buried in the wall. In that third type of structure the relatively thin and flexible tubes containing the optical fibers grip the optical fibers that they contain and prevent virtually all relative movement between the optical fibers and the tubes that contain them.

In all three types of structure the synthetic material sheath is usually extruded around what is usually called the optical core (in the first type of structure the optical core includes the filamentary form strength member and the tubes, in the second type of structure it includes the uni-tube and the tapes, if any, and in the third type of structure it includes the assembly of tubes).

In some installations, the cables run along paths that include vertical sections. An SZ assembly of tubes in a vertical section of optical cable can come apart because of the effect of gravity, each tube tending to unwind and extend vertically in a straight line. The risk of the onset of this unwanted phenomenon is particularly high close to where the winding direction of an SZ tube is reversed.

An optical cable with the first type of structure usually includes a thread for retaining the tubes, specifically to avoid this problem. Clamping forces applied to the tubes by the thread are not transmitted to the optical fibers because the tubes are relatively rigid.

In an optical cable with the third type of structure, using an immobilizing thread to prevent the above problem is not satisfactory. The tubes of an optical cable with the third type of structure are relatively thin and clamping forces applied to the tubes by the thread are therefore transmitted to the optical fibers. The fibers are therefore subjected to stresses interfering with their optical performance.

OBJECTS AND SUMMARY OF THE INVENTION

An object of the invention is to avoid the undesirable consequences of gravity in vertical sections of optical cable having the third type of structure.

To this end, the invention provides an optical fiber cable including an assembly of at least two flexible tubes accommodating optical fibers, a sheath enveloping the assembly of tubes, and at least one filamentary form strength member at the periphery of the assembly of tubes, wherein the tubes are stuck together.

According to other features of the optical cable:

the sheath is made of polyethylene and the tubes are made of polyvinyl chloride (PVC) or a thermoplastics elastomer with diol flexible segments;

the tubes extend in the sheath in a helical or an SZ assembly;

the optical cable includes mechanical reinforcing braids, preferably of aramide, extending between the tubes and the sheath in an annular, preferably helical, assembly;

the optical cable includes sealing members such as a sealing tape extending between the tubes and the sheath in an annular assembly, filamentary form members adapted to swell up extending in the sheath in an assembly interleaved with the tubes, and/or a filling material accommodated in the tubes;

the sheath is delimited by a wall in which at least one filamentary form strength member is buried.

The invention also provides a method of fabricating an optical fiber cable including an assembly of at least two flexible tubes accommodating optical fibers, a sheath enveloping said assembly of tubes, and at least one filamentary form strength member at the periphery of the assembly of tubes, in which method the tubes are made of a synthetic material and the sheath is made of a synthetic material which is heated and extruded around the tubes, wherein, during extrusion of the sheath around the tubes, the temperature at which the material of the sheath is extruded is adjusted to cause the tubes to stick together.

According to another feature of the method, the sheath is made of polyethylene and the tubes are made of polyvinyl chloride or from a thermoplastics elastomer with diol flexible segments, the temperature at which the sheath is extruded being from 170 to 240° C.

BRIEF DESCRIPTION OF THE DRAWING

The invention will be better understood on reading the following description, which is given by way of example only and refers to the accompanying drawing, in which the single figure is a view in cross-section of an improved optical cable in accordance with the invention.

MORE DETAILED DESCRIPTION

The single figure shows an optical fiber cable 10 in accordance with the invention.

The optical cable 10 includes an assembly of flexible tubes 12 each of which accommodates a bundle of conventional optical fibers 14. Each tube 12 contains a dozen optical fibers 14, for example. However, the number of optical fibers 14 can be less than or greater than twelve.

In the example shown, the optical cable 10 includes twelve tubes 12. However, the number of tubes 12 can be different, for example from seven to twelve.

The assembly of tubes 12 is covered with a sheath 16. The tubes 12 preferably extend inside the sheath 16 in a conventional helical or SZ assembly.

Filamentary form members 18 forming tensile reinforcements, referred to hereinafter as strength members, are provided at the periphery of the assembly of tubes 12.

The optical cable 10 preferably includes two diametrally opposed strength members 18 buried in the wall delimiting the sheath 16. The structure and the assembly of the strength members 18 in the sheath 16 are conventional.

The optical cable 10 preferably includes mechanical reinforcing braids 20 made of aramide, for example, extending radially between the tubes 12 and the sheath 16 in an annular assembly, for example in a helix.

The optical cable 10 preferably further includes conventional sealing means.

The sealing means can include a sealing tape 22 extending radially between the tubes 12 and the sheath 16, more particularly between the tubes 12 and the assembly of reinforcing braids 20, in a conventional annular assembly.

The sealing members can equally include filamentary form members (not shown in the figure) adapted two swell up and extending in the sheath 16 in a conventional assembly in which they are interleaved with the tubes 12.

The sealing members can further include a conventional filling material accommodated in the tubes 12 between the optical fibers 14.

The sheath 16 is fabricated in the conventional way from a synthetic material which is heated and extruded around the tubes 12, which are also made of a synthetic material. Note that the wall of the tubes 12 is relatively thin, as is usually the case with the tubes 12 of an optical cable of the type with strength members at the periphery of the assembly of tubes.

In accordance with the invention, the tubes 12 are stuck together. This is achieved while extruding the sheaths 16 around the tubes 12 by adjusting the temperature at which the material of the sheath 16 is extruded so as to cause the tubes 12 to stick together.

The material of the sheath 16, when heated during extrusion, provides the heat energy necessary to cause the tubes to stick together.

The material of the sheath 16 is chosen so that it can be heated to a chosen temperature which is satisfactory for optimum extrusion of the sheath and sufficient to cause the tubes 12 to stick together. Likewise, the material of the tubes 12 is chosen so that the tubes 12 stick together without being melted by the heat when heated by heat energy from the sheath 16 when it is extruded at the chosen temperature.

Accordingly, the sheath is preferably made of polyethylene, in particular high-density polyethylene, and the tubes 12 are preferably made of polyvinyl chloride (PVC) or from a thermoplastics elastomer with diol flexible segments.

The expression "thermoplastics elastomer with diol flexible segments" refers to a copolymer including segments which can be polyether or polymer diol blocks.

For example, the thermoplastics elastomer with diol flexible segments is chosen from the group comprising:

(i) polyether esters, for example including polyether sequences with hydroxy extremities linked to polyester sequences with acid extremities, which structure can also include diols (for example 1,4-butanediol);

(ii) polyurethane ethers, for example including polyether sequences with hydroxy extremities linked to diisocyanates by urethane functions;

(iii) polyurethane esters, for example including polyester sequences with hydroxy extremities linked to diisocyanates by urethane functions;

(iv) polyurethaneether esters, for example including polyester sequences and polyether sequences with hydroxy extremities, these sequences being linked to diisocyanate remainders by urethane functions;

(v) polyetheramides, polyethers with polyamide sequences, for example obtained by reactions between polyamide sequences with diamine chain ends and polyoxyalkylene sequences with dicarboxylic chain ends or between polyamide sequences with diamine chain ends or between polyamide sequences with dicarboxylic chain ends and polyetherdiols, the polyetheramides obtained then being polyetheresteramides.

In particular, the polyetheresters are thermoplastics copolyester elastomers. One example of a commercially available product is the polymer Hytrel® from Dupont. The international acronym for these thermoplastics elastomers is TEEE (thermoplastics ether-ester elastomers).

Note that the tubes 12 when made from a thermoplastics elastomer with diol flexible segments are relatively easy to tear to obtain easy access to the optical fibers 14 contained in the tubes 12.

Also, thermoplastics polyurethane (TPU) elastomers are polyurethane-based copolymers that can be obtained by conjointly reacting a polymer diol (or macroglycol with a molecular weight from 1 000 to 3 500, for example), and where applicable a diol (or a chain extender of low molecular weight, generally less than 300) with a diisocyanate.

Examples of commercially available products are Elastollan® 1185 (PU-ether), Elastollan® 1190 (PU-ether), Elastollan® C85 (PU-ester) and Elastollan® C90 (PU-ester) from BASF and Desmopan® 588 (PU-etherester) and Desmopan® 385 (PU-etherester) from Bayer.

For example, when it is extruded around the assembly of tubes 12 the polyethylene sheath 16 is heated to a temperature from 170 to 240° C., preferably from 220 to 220° C. At this temperature, the sheath 16 transfers sufficient heat to the tubes 12 to cross any reinforcing braid layers or sealing members and to cause the tubes 12 to stick together without melting.

Among the advantages of the invention, it will be noted that, thanks to the tubes 12 sticking together, the helix or SZ assembly of tubes 12 cannot come apart in a vertical section of optical cable 10 due to the effect of gravity. However, despite them sticking together, the tubes 12 can be separated from each other relatively easily by applying to each of them a relatively low force, usually not more than one Newton, which provides easy access to the optical fibers for connecting them.

What is claimed is:

1. An optical fiber cable including an assembly of at least two flexible tubes accommodating optical fibers, a sheath enveloping the assembly of tubes, and at least one filamentary form strength member at the periphery of the assembly of tubes, wherein the tubes are stuck together.

2. A cable according to claim 1, wherein the sheath is made of polyethylene and the tubes are made of polyvinyl chloride (PVC) or a thermoplastics elastomer with diol flexible segments.

3. A cable according to claim 1, wherein the tubes extend in the sheath in a helical or an SZ assembly.

4. A cable according to claim 1, including mechanical reinforcing braids, preferably of aramide, extending between the tubes and the sheath in an annular, preferably helical, assembly.

5. A cable according to claim 1, including sealing members such as a sealing tape extending between the tubes and the sheath in an annular assembly, filamentary form members adapted to swell up extending in the sheath in an assembly interleaved with the tubes, and/or a filling material accommodated in the tubes.

6. A cable according to claim 1, wherein the sheath is delimited by a wall in which at least one filamentary form strength member is buried.

7. A method of fabricating a optical fiber cable including an assembly of at least two flexible tubes accommodating optical fibers, a sheath enveloping said assembly of tubes, and at least one filamentary form strength member at the periphery of the assembly of tubes, in which method the tubes are made of a synthetic material and the sheath is made of a synthetic material which is heated and extruded around the tubes, wherein, during extrusion of the sheath around the tubes, the temperature at which the material of the sheath is extruded is adjusted to cause the tubes to stick together.

8. A method according to claim 7, wherein the sheath is made of polyethylene and the tubes are made of polyvinyl chloride (PVC) or from a thermoplastics elastomer with diol flexible segments, the temperature at which the sheath is extruded being from 170 to 240° C., preferable from 200 to 220° C.

9. An optical fiber cable comprising:
an assembly of at least two flexible tubes accommodating optical fibers;
a sheath enveloping an assembly of the tubes;
mechanical reinforcing braids extending radically between the tubes and the sheath;
sealing means extending radically between the tubes and the reinforcing braids; and
a plurality of filamentary form strength members located in the sealing means and the sheath;
wherein said tubes are adhered to each other.

10. The optical fiber cable according to claim 9, further comprising two diametrically opposed the filamentary form strength members buried in a wall delimiting the sheath.

11. The optical fiber cable according to claim 9, wherein the sealing means further comprising a sealing tape radically extending between the tubes and the reinforcing braids.

12. The optical fiber cable according to claim 9, wherein said tubes are thermally adhered to each other.

* * * * *